United States Patent [19]
Hofel et al.

[11] 3,875,089
[45] Apr. 1, 1975

[54] PROCESS FOR THE MANUFACTURE OF DISPERSIONS OF THERMOSETTING PHENOLIC RESIN REACTION PRODUCTS

[75] Inventors: Heinz-Bernhard Hofel; Hans-Joachim Kiessling, both of Hamburg; Fred Lampert, Barsbuttel, Achtern Barg, all of Germany

[73] Assignee: Hoechst Aktiengesellschaft, Frankfurt, Germany

[22] Filed: June 18, 1973

[21] Appl. No.: 370,771

[30] Foreign Application Priority Data
Sept. 19, 1972 Switzerland............... 13675/72
June 19, 1972 Switzerland............... 9197/72

[52] U.S. Cl.............. 260/14, 117/161 L, 260/29.3, 260/51.5, 260/57 A
[51] Int. Cl................ C08b 21/32, C08g 37/14
[58] Field of Search......... 260/14, 29.3, 51.5, 57 A, 260/17.2

[56] References Cited
UNITED STATES PATENTS

| | | | |
|---|---|---|---|
| 2,482,525 | 9/1949 | Wachter | 260/29.3 |
| 2,675,335 | 4/1954 | Rankin et al. | 260/29.3 |
| 3,351,612 | 11/1967 | Brown et al. | 260/29.3 |
| 3,459,128 | 8/1969 | Erdmann | 260/29.3 |
| 3,697,482 | 10/1972 | Hunsucker | 260/29.3 |
| 3,703,494 | 11/1972 | Anderson et al. | 260/29.3 |
| 3,761,448 | 9/1973 | Anderson et al. | 260/29.3 |
| 3,770,544 | 11/1973 | Holt | 260/29.3 |

FOREIGN PATENTS OR APPLICATIONS
909,433  9/1972  Canada............................ 260/29.3

OTHER PUBLICATIONS
Vol. 653, O.G. 12/18/51, page 859, Abstract, 713,087, "Phenolic Coating Composition and Process," Schwartzberg.

*Primary Examiner*—Morris Liebman
*Assistant Examiner*—Edward Woodberry
*Attorney, Agent, or Firm*—Gordon W. Hueschen

[57] ABSTRACT

Subject of the invention is a process for the manufacture of water-dilutable, aqueous dispersions, containing emulsifiers and protective colloids, of thermosetting reaction products of monohydroxybenzene compounds or mixtures of monohydroxybenzene compounds with formaldehyde in water, wherein these components are reacted with one another in water in the presence of basic nitrogen compounds, whilst warming, in a three-stage process.

7 Claims, No Drawings

PROCESS FOR THE MANUFACTURE OF DISPERSIONS OF THERMOSETTING PHENOLIC RESIN REACTION PRODUCTS

BACKGROUND OF THE INVENTION

1. Field of the invention

The present invention relates to a process for the manufacture of water dilutable aqueous dispersions containing emulsifiers and protective colloids, of thermosetting reaction products of monohydroxybenzene compounds or mixtures of monohydroxybenzene compounds with formaldehyde in water, these components being caused to react with one another in water in the presence of basic nitrogen compounds, whilst warming.

Numerous proposals for the manufacture of aqueous dispersions of thermosetting phenolic resins have already been described in the relevant literature. However, the proposals made hitherto have not proved successful in practice so that dispersions of thermosetting phenolformaldehyde resol resins are not yet customary commercially available articles.

2. Prior Art

German Patent Specification No. 838,215 describes a process for the manufacture of stable, aqueous dispersions of soluble phenolic resins which is characterised in that solutions of the phenolic resins in organic solvents are dispersed in water with the aid of soap-like emulsifiers and of polyvinyl alcohol or its water-soluble derivatives.

However, these dispersions have the great disadvantage that the phenolic resin must first be taken up in an organic solvent and hence the dispersion also contains considerable amounts of organic solvents.

In using these dispersions, the organic solvents also have to be evaporated so that expensive equipment must be used in order to meet the environmental standards of industrial hygiene.

German Offenlegungsschrift 1,745,192 describes a process for the manufacture of aqueous emulsions of phenolformaldehyde resol resins for impregnating fibrous substances, such as paper, in which the phenol is caused to react with an excess of formaldehyde in water in the presence of organic bases containing amino groups, and which is characterised in that the reaction between phenol and formaldehyde is carried out in an aqueous medium in which organic nitrogen bases with tertiary and primary and/or secondary amino groups are present, the ratio between the tertiary amino groups on the one hand and the primary and/or secondary amino groups on the other being between 1:2.5 and 1:1.5. The disadvantage of these aqueous emulsions is that they still contain ions and that therefore they cannot be used to achieve the optimum properties of the impregnated fibrous substances, due to the interfering ion content.

Furthermore, this process only yields aqueous emulsions in which the condensation between phenol and formaldehyde has not been taken to completion. This means that these emulsions still contain free phenol and/or formaldehyde which are both highly toxic so that again, when using these emulsions, special precautionary measures are necessary through the use of expensive installations for avoiding impermissible pollution of the environment.

German Offenlegungsschrift 1,595,038 describes a process for the manufacture of an emulsion of thermosetting low molecular reaction product of a monohydroxybenzene compound or of a mixture of monohydroxybenzene compounds and formaldehyde in water, wherein the compounds mentioned are reacted with one another in water in the presence of a basic substance, using an amide with a long carbon chain as a plasticiser, and which is characterised in that the amide used is oleylamide. These emulsions have the disadvantages already explained above since, being reaction products of low condensation, they still contain considerable proportions of free phenol and/or formaldehyde. Furthermore, the emulsified phenol-formaldehyde resin obtained according to this process is so brittle that it can only be used together with an additional plasticiser, which can result in further disadvantages due to migration of the plasticiser.

German Offenlegungsschrift 2,034,136 describes a phenol-aldehyde condensation product which is characterised in that it is obtained by reaction, at about 60° to 80°C, of a. 1 mol of a monohydric phenol with at least two hydrogen atoms which are reactive towards an aldehyde and b. at least one mol of an aldehyde of the general formula

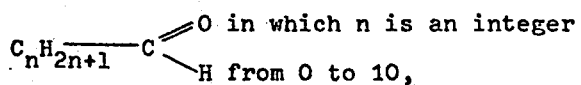

c. in the presence of a salt of a metal of the transition group of the periodic system of the elements and of a monocarboxylic acid of the general formula

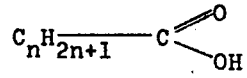

in which $n$ is an integer from 0 to 10, and that it has a strong IR absorption at a wavelength of 1,010 cm$^{-1}$ and 1,050 cm$^{-1}$.

According to the statement on page 23, last paragraph, and page 24, paragraph 1, the phenol-aldehyde condensation product described there, liquefied by warming, can be emulsified in an aqueous solution which contains 1% of hydroxyethylcellulose and a non-ionic surface-active agent (= Triton × 100) as a 1% strength solution, using a special stirrer. As can be seen from page 13, the resin used contains zinc acetate as the ionic compound and furthermore the resin additionally contains 12% of volatile compounds so that this resin again suffers from the disadvantages mentioned above.

It is the aim of the present invention to improve the phenol-formaldehyde resins of conventional type, present in aqueous distribution, in various directions. As is known, the thermosetting aqueous solutions of phenol-formaldehyde resins can only be stored for a few weeks since they condense further over the course of time and hence lose their solubility in water. However, in order to be capable of storage for at least a few weeks, these solutions must necessarily still contain considerable proportions of free phenol and free formaldehyde. Some types of these phenolic resin solutions are additionally alkaline and therefore contain ions. In using these known aqueous phenol-formaldehyde resin solutions, considerable amounts of phenol and formaldehyde evaporate so that special precautionary measures must be taken to exclude impermissible pollution of the environment by these highly toxic compounds. The phenol-formaldehyde resins contained in the dispersions according to the invention are present in a stable form so that these dispersions can be stored practically indefinitely, which after setting can be converted into dispersions by simple stirring. Furthermore, the proportion of undesired volatile constituents is lower by powers of ten than in the known phenolic resin solutions. Furthermore, the phenol-formaldehyde resins contained in the dispersions manufactured according to the invention can be manufactured extremely economically since the starting substances are converted to the resin to the extent of practically 100%. This however also results in higher effectiveness during further use, since, in comparison to the previously known aqueous solutions, unreacted reactants are no longer present as ballast substances. Since, unlike previously, no volatile constituents are present during use and instead these constituents have been reacted to give the resin, both the economics of the manufacturing process and the economics of use are improved in an unforeseeable and abrupt manner and a considerable contribution is made to avoiding pollution of the environment.

Furthermore, the dispersions according to the invention have the great advantage that they can also entirely replace the previous phenolic resin solutions in which the phenolic resin is present dissolved in an organic solvent. The previously known phenolic resin solutions also still contain free phenol, free formaldehyde and organic solvent, which in general also has a toxic effect. Hence, considerable advantages in industrial hygiene result from the replacement of these phenolic resin solutions. However, considerable economic advantages also result since the explosion-proof processing installations and solvent recovery installations previously required are unnecessary.

Furthermore, the use of the dispersions manufactured according to the invention is substantially simpler than the use of phenolic resins dissolved in the solvent, since the substrates treated with the dispersions manufactured according to the invention are in general only subjected to a physical drying process and are then in the form of finished goods or semifinished goods which can be processed further.

The Japanese Displayed Specification Sho 46–27256 discloses a process for the manufacture of emulsions of phenolic resins characterized by reacting a. phenol (10–100 parts by weight),
b. low molecular amino compounds reactive with formaldehyde
   or xylene (0–90 parts by weight) and
c. aldehyde or similar reacting compounds (0.3 mols relative to 1 mol of the sum of $a$ and $b$, reduced to aldehyde contents)

in such a manner that either the components are reacted in the presence of polyvinylalcohol until a product is obtained, which is not soluble in aqueous solutions of pH below 11, and thereafter adding an emulsifier at once, or that the reaction of all components is carried on so long until a product is obtained, which is not soluble in aqueous solutions of pH below 11, and thereafter adding the emulsifier together with polyvinylalcohol at once and converting the reaction mix into a system having a pH of below 11.

The Specification of this Japanese patent application discloses that phenolic resins have to be treated with the emulsifier nearly at once after finishing the reaction. Accordingly no stable emulsions are obtained by addition of the emulsifier to the resin after cooling of the reaction mix nor after heating again.

An addition of emulsifier before finishing the phenol-forming reaction also is not desirable, since the emulsifier reacts with the aldehydes.

According to the teachings of the Japanese patent application the emulsifier may be added only after the phenolic resin has been obtained. Therefore it has been surprising that in the process of the present invention a non-ionic emulsifier is already added during the manufacture of the phenolic resin. Using the same non-ionic emulsifier no water-dilutable emulsions of the type water-in-resin can be obtained according to the method of the Japanese patent specification, while according to the method of the present invention always water-dilutable dispersions of the type phenolic resin-in-water are obtained. That is, even the same emulsifier does not lead to water-dilutable phenolic resin dispersions, if the known method of the Japanese patent application is employed for the production. For this reason the result of the method according to the present invention is rather surprising. The advance over this known working method has been proven to the end of this specification by comparison tests.

SUMMARY

Subject of the invention is a process for the manufacture of water-dilutable, aqueous dispersions, containing emulsifiers and protective colloids, of thermosetting reaction products of substituted phenols individually or mixture of phenols with formaldehyde in water, wherein these components are reacted with one another, under warm conditions, in water, in the presence of nitrogen compounds which have a basic reaction, characterized in that A. a mixture consisting of at least one substituted phenol (I) having only one phenolic hydroxyl group in the molecule, and phenol (II), formaldehyde or formaldehyde donors respectively, and basic nitrogen compounds chosen from the group consisting of ammonia and/or primary or secondary amines, the mixture of at least one substituted phenol (I) having one phenolic hydroxyl group per molecule, and phenol (II) being employed in such ratios that the average functionality of the sum of these phenolic compounds (I and II) relative to formaldehyde is between 2.1 and 2.8, and the amount of formaldehyde being so chosen that the molar ratio of the total sum of added formaldehyde to the sum of the phenolic compounds (I and II) is between 1.0 and 1.4:1, and the basic nitrogen compound being used in amounts of 5 to 50 mol per cent relative to the total weight of the phenols (I and II), is employed, or B. substituted phenols having the overall formula III

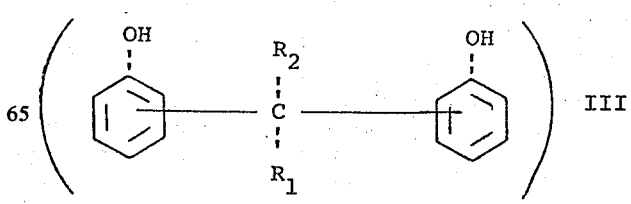

wherein R₁ and R₂ are identical or different and denote a hydrogen atom or an aliphatic radical of the general formula $C_nH_{2n+1}$, wherein n has the values 1 to 5 with the limitation that the substituent

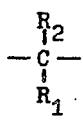

has to be in o- and/or p-position relative to the phenolic hydroxyl groups, individually or in mixture and/or in mixture with substituted phenol (I) having only one phenolic hydroxyl group in the molecule, and/or phenol (II) - being employed in such ratios that the average functionality of the sum of the benzene rings carrying hydroxyl groups ((III); (II and III); (III and I); (III. I and II)) relative to formaldehyde is between 2.1 and 2.8, wherein the substituted phenols of formula (III) having a functionality relative to formaldehyde of 2.5 per benzene ring carrying phenolic hydroxyl groups is used for calculating the functionality - formaldehyde or formaldehyde donors respectively, and basic nitrogen compounds chosen from the group consisting of ammonia and/or primary or secondary amines, wherein the amount of formaldehyde is so chosen that the molar ratio of the total sum of all condensed formaldehyde to the sum of benzene rings carrying phenolic hydroxy groups amounts to 1.0 to 1.4 : 1, wherein substituted phenols of formula (III) are counted as such phenols containing already condensed formaldehyde in the molar ratio of 0.5 : 1 to benzene rings carrying hydroxyl groups, and wherein the basic nitrogen compounds are employed in amounts of 5 to 50 mol percent relative to the sum of benzene rings carrying phenolic hydroxyl groups, C. in the presence of such amounts of water that the sum of added water and water of reaction which is formed is 30 to 60% by weight, relative to the weight of the total batch, and at least 5 to 25 percent by weight relative to the total weight of the phenols according to (A) or (B), of a non-ionic emulsifier which is compatible with phenolic resin; as well as in the presence of polyvinyl alcohol and hydroxyethylcellulose, the weight ratio of polyvinyl alcohol employed to hydroxyethylcellulose employed being 2:1 to 4:1 and the sum of polyvinyl alcohol and hydroxyethylcellulose being 5 to 25 percent by weight, relative to the total weight of the phenols (according to A or B), is employed, and that the batch is warmed until a withdrawn sample of the dispersion has a B-time of 30 seconds to 10 minutes at 160°C, and the batch is subsequently cooled whilst stirring and optionally whilst adding water. A further object of the invention is a method for the production of water-dilutable, aqueous dispersions containing emulsifiers and protective colloids of thermosetting reaction products of mixtures of phenols and formaldehyde in water, whereby these components are made to react by heating in the presence of basic nitrogen compounds, characterized in that I. in the first step the mixture of phenols as aralkylphenol solution in phenol is produced by reacting 1 mol of phenol with 1 mol of styrene or styrene derivative in excess phenol as the solvent by heating, whereby about 2 to 5% by weight of oxalic acid, preferably 2.5 to 3.5% by weight, relative to the total amount of phenol and styrene or styrene derivative respectively, are employed and the mixture is heated in one step to about 150° to 160°C and kept at this temperature until at least 95% by weight of the styrene or styrene derivative employed is present in reacted form, and II. (A) in the second step the obtained solution of the raw product (without further purification) as mixture consisting of at least one substituted phenol (I) containing only one hydroxyl group per molecule, and phenol (II), formaldehyde or formaldehyde donors and basic nitrogen compounds chosen from the group consisting of ammonia and/or primary or secondary amines, whereby the mixture (raw product solution) of at least one substituted phenol (I) having one phenolic hydroxyl group per molecule, and phenol (II) is employed in such amounts that the average functionality of the sum of these phenolic compounds (I and II in the raw product solution) to formaldehyde is between 2.1 and 2.8 and the amount of formaldehyde is so chosen that the molar ratio of the total sum of added formaldehyde to the sum of phenolic compounds (I and II) (in the raw product solution) is between 1.0 to 1.4 and 1 and wherein the basic nitrogen compound being employed in amounts of 5 to 50 mol%, relative to the total weight of phenols (I and II) (in the raw product solution), is employed, or in the second step B. substituted phenols having the overall formula III

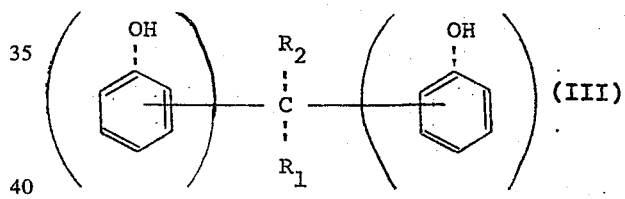

wherein R₁ and R₂ are identical or different and denote a hydrogen atom or an aliphatic radical of the general formula $C_nH_{2n+1}$, wherein n has the values 1 to 5 with the limitation that the substituent

has to be in o- and/or p-position relative to the phenolic hydroxyl groups, individually or in mixture and/or in mixture with substituted phenol (I) having only one phenolic hydroxyl group in the molecule, and phenol (II) (as raw product solution) - being employed in such ratios that the average functionality of the sum of the benzene rings carrying hydroxyl groups ((III); (I and II)) relative to formaldehyde is between 2.1 and 2.8, wherein the substituted phenols of formula (III) having a functionality relative to formaldehyde of 2.5 per benzene ring carrying phenolic hydroxyl groups is used for calculating the functionality - formaldehyde or formaldehyde donors respectively, and basic nitrogen compounds chosen from the group consisting of ammonia and/or primary or secondary amines, wherein the amount of formaldehyde is so chosen that the molar ratio of the total sum of all condensed formaldehyde to the sum of benzene rings carrying phenolic hydroxyl groups amounts to 1.0 to 1.4 : 1, wherein substituted phenols of formula (III) are counted as such phenols containing already condensed formaldehyde in the molar ratio of 0.5 : 1 to benzene rings carrying hydroxyl groups, and wherein the basic nitrogen compounds are employed in amounts of 5 to 50 mol percent relative to the sum of benzene rings carrying phenolic hydroxyl groups, C. in the presence of such amounts of water that the sum of added water and water of reaction which is formed is 30 to 60% by weight, relative to the weight of the total batch, and at least 5 to 25 percent by weight relative to the total weight of the phenols according to (A) or (B), of a non-ionic emulsifier which is compatible with phenolic resin, polyvinyl alcohol and hydroxyethylcellulose, the weight ratio of polyvinyl alcohol employed to hydroxyethylcellulose employed being 2:1 to 4:1 and the sum of polyvinyl alcohol and hydroxyethylcellulose being 5 to 25 percent by weight, relative to the total weight of the phenols (acording to A or B), is employed, and that the batch is warmed until a withdrawn sample of the dispersion has a B-time of 30 seconds to 10 minutes at 160°C, and the batch is subsequently cooled whilst stirring and optionally whilst adding water.

The B-time or curing time test is carried out based on test procedure 4 described in the book "Kunststoffpraktikum" ("Practical Plastics") (Gaetano D'Alelio, Carl-Hanser-Verlag/Munich 1952, page 174), wherein 0.3 g of resin is stirred at the indicated temperature in a bowl of 2 cm diameter and maximum depth 8 mm, by means of a glass rod drawn out to a point, until the resin has cured, and the time required for this is measured.

By thermosetting reaction products of monohydroxybenzene compounds or mixtures of monohydroxybenzene compounds with formaldehyde there are understood resinous condensates, such as are known to those skilled in the art under the description resols. (Compare Ullmanns Enzyklopadie der technischen Chemie, Urban & Schwarzenberg, Munich, Berlin, 1962, pages 459 – 467.)

The following can be used as basic nitrogen compounds which are present during the reaction: Ammonia and/or primary and/or secondary amines; preferably, ammonia or amines which have an equal or greater basicity than ammonia are used.

Suitable substituted phenols (I) are those which contain as substituents, alkyl radicals with 1 – 30 C atoms, cycloalkyl radicals with 5 – 10 C atoms which can be of monocyclic or bicyclic structure, alkenyl radicals with 1 – 30 C atoms and/or cycloalkenyl radicals with 5 – 10 C atoms which are also of monocyclic or bicyclic structure. Halogen-substituted phenols and aryl-substituted phenols with an aromatic ring in the substituent are also suitable.

Substituted phenols (I) must be so chosen that they possess 1, 2, 3 or 4 substituents in the phenol nucleus, but at least 1 carbon atom of the phenol which is capable of reacting with formaldehyde must be present in the ring, and the speed of reaction of the substituted phenol with formaldehyde is 40 to 150% of the speed of reaction of the unsubstituted phenol. (Compare L. A. Cohen and W. M. Jones; Journal of the American Chemical Society, year 85 (1963), page 3402. The speed of reaction can be determined by comparative measurements of the formaldehyde consumption as a function of the reaction time in alkaline molar solutions of the phenols.) By reaction speed there is here understood the effective reaction speed measured in the heterogeneous medium.

However, preferred substituted phenols (I) are those which contain 2 carbon atoms, capable of reacting with formaldehyde, in the phenol ring. Substituted phenols (I) with 3 reactive positions in the phenol ring can be used conjointly in minor amounts, either individually or as mixtures.

The following can be used as substituted phenols (I) for the present process: m-cresol, 3,4-, 3,5- and 2,5-dimethylphenol, m-ethylphenol, m-propylphenol, m-, n-butylphenol, p-tert.-butylphenol, o- and/or p-, n- and/or isopropenylphenol, o- and/or p-allylphenol, o-phenylphenol, p-phenylphenol, m-phenylphenol, o- and/or p-α- and/or -β-phenylethylphenol individually or as mixtures, o- and/or p-α- and/or -β-phenylisopropylphenol, o- and/or p-α- and/or -β-methylphenylethylphenol, and also technical alkylation products from olefines and phenols, the manufacture of which has been described, for example, in British Patent Specification No. 327,382, page 5, lines 25 – 34, as well as o- and/or p-aminophenols.

Dihydroxydiphenylalkane derivatives of the general formula

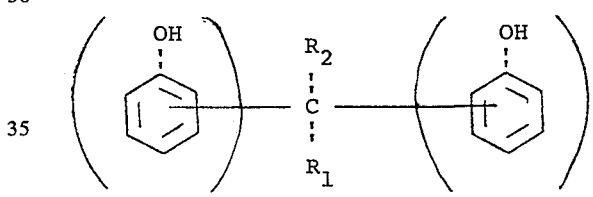

wherein $R_1$ and $R_2$ are identical or different and denote a hydrogen atom or an aliphatic radical of the general formula $C_nH_{2n+1}$, wherein n has the values 1 to 5 with the limitation that the substituent

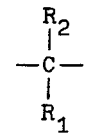

has to be in o- and/or p-position relative to the phenolic hydroxyl groups, can also be used as substituted phenols (III).

Preferably 1,1-di(4'-hydroxyphenyl)-2-methylpropane and bisphenol A are used.

The following are suitable for use as formaldehyde or formaldehyde donors: Aqueous formaldehyde solutions, gaseous formaldehyde, paraformaldehyde and hexamethylenetetramine. Aqueous formaldehyde is preferred.

The suitable primary or secondary amines include these organic substances which contain one or more primary amino groups or one or more secondary amino groups - and optionally both primary and secondary amino groups - and which are soluble in the reaction mixture and are preferably not less basic than ammonia, which means that the pK value should be ≤ 5° at 20°C. For simplicity, NH₃ will be included amongst the primary amines in the following text.

Examples of such amines are:

Ammonia (NH₃), ethylamine, isobutylamine, tertiary butylamine, cyclohexylamine, ethanolamine, diethylamine, diisopropylamine, diethanolamine, piperidine, methylpyrrolidine, morpholine, ethylenediamine, hexamethylenediamine, piperazine, diethylenetriamine, triethylenetetramine and guanidine. Preferably ammonia is employed.

The following can be used as non-ionic emulsifiers which are compatible with phenolic resin: addition products of ethylene oxide to monosubstituted or polysubstituted alkyl phenols such as are described, for example, in the publication from Farbwerke Hoechst AG, Frankfurt/M., Hoe.2825 TH/S of November 1962, under the title "Arkopal N-Marken" ("Arkopal N Grades")! wherein 10 – 35 mols of ethylene oxide are added in the manner of a polyether onto the alkylphenol, as well as ethylene oxide adducts onto polypropylene glycols of various chain lengths, such as have been described in the publication from Messrs. C. H. Erbsloh, Dusseldorf, under the title "Pluronic." Furthermore, ethylene oxide addition products to natural resin acids, such as, for example, abietic acid, as have been described in the publication from Farbenfabriken Bayer AG, Leverkusen (Le 681(N) of January, 1968) under the title "Emulgator U," are suitable. Polyoxythylene alkyl ethers, polyoxyethylene alkyl esters, polyoxyethylene sorbitane monoalkyl esters, polyoxyethylene alkylamines, polyoxyethylene alkylamides polyethyleneimines and other customary non-ionic agents, where these are compatible with phenolic resin, can also be used.

The addition products of about 30 mols of ethylene oxide onto p-n-nonylphenol and ethylene oxide adducts onto propylene glycol are employed preferentially having 75 to 80 mol percent ethylene oxide.

In the sense of the invention, polyvinyl alcohol is to be understood as polyvinyl alcohol and its water-soluble derivatives (for example, products in which about 5% of hydroxyl groups are acetalised, say with butylraldehyde, or in which up to about 15% of the hydroxyl groups are esterified, say with acetic acid). (Compare Ullmanns Enzyklopadie der technischen Chemie, 1962, Volume 14, pages 236 – 241.)

In the reaction, a part of the polyvinyl alcohol is condensed into the phenolic resin.

A polyvinyl alcohol saponified to 88 mol percent and/or 98 mol percent, having a degree of polymerization of 500 – 1500 is employed preferably. By hydroxyethylcellulose commercial partial ethers of cellulose and ethylene glycol are understood (compare Ullmanns Enzyklopadie der technischen Chemie, 1962, Volume 171).

The dispersions manufactured according to the invention can be employed in all fields of use of conventional phenolic resins or phenolic resin solutions and offer additional technical and commercial advantages through avoiding inflammable and/or toxic solvents and through the low content of unreacted volatile starting compounds. As examples of fields of use there may be mentioned: Lacquers and coating agents, binders for the manufacture of slag wool slabs, hard papers and hard fabrics, based on cotton or glass fabrics, for decorative and electronic purposes, battery separators, air filter papers and oil filter papers for motor vehicles, abrasives, such as abrasive paper, abrasive cloth and abrasive discs, thermosetting molding materials for the manufacture of cured moldings, such as, for example, brake linings, and binders for materials based on wood, such as plywood, chipboard and hardboards. Plasticisers, for example, dibutyl phthalate, triphenyl phosphate, tricresyl phosphate, wood oils and other conjugated unsaturated oils can be added to the dispersion during or after manufacture.

EXAMPLE 1

2 mols of phenol, 2 mols of phenylethylphenol, 352 g of a 44% strength by weight aqueous formaldehyde solution, 80 g of an 80% strength by weight aqueous solution of a polyethylene glycol ether of nonylphenol which contains 30 mols of ethylene oxide per mol of nonylphenol, 30 g of a 25% strength by weight aqueous ammonia solution, 30 g of a polyvinyl alcohol saponified to the extent of 98 mol %, 10 g of a hydroxyethylcellulose and 200 g of deionised water are heated to the boil under reflux for 4 hours, whilst stirring. Thereafter a further 200 g of deionised water are added whilst stirring and the mixture is cooled to below 40°C whilst stirring.

The dispersion of the oil-in-water type, thus obtained, is white in colour; it attains a solids content of 43.4% and has a viscosity of 2,000 cP at 20°C.

A hard (impregnated) paper made with this dispersion has the following properties (the manufacture of such hard papers is described, for instance, in the printings of Reichhold-Albert-Chemie Aktiengesellschaft, Hamburg, of December 1969, with titles "Durophen PP 192" and "Phenodur PR 271"):

| Dispersion according to Example 1 | | |
|---|---|---|
| pre-impregnating resin | 14 % | |
| total resin | 140 % | |
| thickness of the hard paper in mm | 1.67 | |
| punching index 70°C | | |
| DIN 53,488  longitudinal | 2.8 | |
| transverse | 2.6 | |
| water absorption mg% | 34.2;  35.2;  34.4; | |
| DIN 53,475 | 0.66;  0.67;  0.69 | |
| surface resistance 1000 V | 1.6.10¹⁰ Ohm | |
| DIN 54,482 | | |
| volume resistance 1000 V | 3.2.10¹⁰ Ohm | |
| DIN 53,482 | | |
| corrosion | A/B 1.6 | |
| dielectric constant | | |
| DIN 53,483  ε | 1000 Hz | 5.1 |
| | 50 Hz | 5.35 |
| DIN 53,483 tan δ | 1000 Hz | 0.024 |
| | 50 Hz | 0.063 |

EXAMPLE 2

Here, the procedure indicated in Example 1 is followed but additionally 5 g of triethylamine are added to the batch. The dispersion thus obtained has a residual phenol content of 1.8%.

EXAMPLE 3

Here, the procedure indicated in Example 1 is followed but instead of the 2 mols of phenylethylphenol 2 mols of p-nonylphenol are employed.

The dispersion thus obtained is distinguished, relative to that obtained according to Example 1, through having an increased physical drying speed.

EXAMPLE 4

The procedure indicated in Example 2 is followed but instead of the 352 g of 44% strength by weight aqueous formaldehyde solution 382 g of this solution are employed.

The dispersion thus obtained is distinguished by increased curing speed.

EXAMPLE 5

2 mols of 1,1-di-(4-hydroxyphenyl)-2-methyl-propane, 353 g of a 44% strength by weight aqueous formaldehyde solution, 350 g of deionised water, 30 g of a 25% strength by weight aqueous ammonia solution, 10 g of a polyvinyl alcohol saponified to the extent of 88 mol%, 20 g of a polyvinyl alcohol saponified to the extent of 98 mol%, 10 g of a hydroxyethylcellulose, 18 g of a polyglycol ether of a polypropylene glycol which contains 80 mol% of ethylene oxide per mol, and 40 g of a polyethylene glycol ether of nonylphenol which contains 30 mols of reacted ethylene oxide per mol of nonylphenol, are kept at the boil under reflux for 3 hours, whilst stirring. Thereafter the mixture is cooled to below 40°C whilst stirring. The dispersion thus obtained has a solids content of 54.5% and is distinguished by increased speed of curing relative to the dispersion obtained according to Example 1.

EXAMPLE 6

The procedure indicated in Example 5 is followed but the dihydroxyphenyl propane derivative is employed as a solution in 200 g of benzene and after termination of the dispersion condensation this solvent is distilled off in steam, the water distilled off being returned to the batch.

The dispersion thus obtained is distinguished by a small particle size.

EXAMPLE 7

The instructions in Example 1 are followed but instead of the 352 g of 44% strength by weight aqueous formaldehyde solution only 300 g of this solution are employed.

The dispersion thus obtained is distinguished by a lower speed of curing, which also permits the manufacture of thicker laminates.

EXAMPLE 8

The instructions of Example 1 are followed but instead of the 352 g of 44% strength by weight aqueous formaldehyde solution only 320 g of this solution are employed. Furthermore, 50 g of isobutanol are added to the batch and after termination of the reaction the isobutanol is again distilled off together with 100 g of deionised water which has also been added.

The dispersion thus obtained is distinguished by a residual phenol content of 1.2%.

The properties of a hard paper manufactured with this dispersion (the manufacture of such hard papers is described, for example, in the publication of Reichhold-Albert-Chemie Aktiengesellschaft, Hamburg, of December 1969, entitled "Durophen PP 192" and "Phenodur PR 271") are as follows:

| Dispersion according to Example 8 | | |
|---|---|---|
| application of resin % | | 96 % |
| thickness of hard paper in mm | | 1.25 mm |
| absorption of water | | 35.1 mg |
| surface resistance after pre-treatment a + b | 100 V | $1.5 \cdot 10^{11}$ Ohm |
|  | 1000 V | $6 \cdot 10^{9}$ Ohm |
| tan δ after pre-treatment a + b | 50 Hz | 0.16 |
|  | 1000 Hz | 0.044 |
| dielectric constant after pre-treatment a + b | 50 Hz | 5.9 |
|  | 1000 Hz | 5.25 |
| corrosion | | A/B 1.8 |
| punching index at 70°C | | 2.6; 2.7 |
| bending strength N/mm² | | 150.3; 119.9 |

EXAMPLE 9

The instructions in Example 8 are followed but additionally 150 g of wood oil and 150 g of deionised water are employed.

The dispersion thus obtained is distinguished by greater elasticity of the laminates obtained from it.

EXAMPLE 10

The instructions of Example 1 are followed, but instead of 352 g of 44% strength by weight aqueous formaldehyde solution only 320 g of this solution are employed. Instead of 30 g of a 98 mol percent saponified polyvinyl alcohol only 20 g are employed with additional further 5 g of a 88 mol percent saponified polyvinyl alcohol (polymerization degree 1000).

The obtained water-dilutable aqueous dispersion has an especially decreased setting speed.

The properties of a hard paper manufactured with this dispersion (the manufacture of such hard papers is described, for example, in the publications by Reichhold-Albert-Chemie Aktiengesellschaft, Hamburg, of December 1969, entitled "Durophen PP 192" and "Phenodur PR 271") are as follows:

| Dispersion according to Example 10 | | |
|---|---|---|
| resin for pre-treatment | | 14 % |
| total resin | | 109 % |
| thickness of hard paper in mm | | 1.39 mm |
| punching index at 70°C longitudinal | | 2.4 |
| transverse | | 2.3 |
| water absorption mg % | | 32.9; 33.2; 34.0; 0.68; 0.69; 0.72 |
| surface resistance | 1000 v | $2.10^{10}$ Ohm |
| Volume resistance | 1000 V | $5.10^{10}$ Ohm |
| corrosion | | A/B −1.6 |
| dielectric constant: ε | 1000 Hz | 5.1 |
|  | 50 Hz | 5.4 |
| tan δ | 1000 Hz | 0.025 |
|  | 50 Hz | 0.073 |

EXAMPLE 11

The instructions of Example 9 are followed, but instead of 30 g of a 98 mol percent saponified polyvinyl alcohol only 20 g are employed with additional further 5 g of a 88 mol percent saponified polyvinyl alcohol (polymerization degree 1000).

The obtained water-dilutable aqueous dispersion has a decreased setting speed.

The properties of a hard paper manufactured with this dispersion (the manufacture of such hard papers is described, for example, in the publications of Reichhold-Albert-Chemie Aktiengesellschaft, Hamburg, of December 1969, entitled "Durophen PP 192" and "Phenodur PR 271") are as follows:

Dispersion according to Example 11

| | | |
|---|---|---|
| resin for pre-treatment | | 14 % |
| total resin | | 142 % |
| thickness of hard paper in mm | | 1.71 |
| punching index at room temperature | | |
| longitudinal | | 2.8 |
| transverse | | 2.4 |
| water absorption mg % | | 45.2; 41.2; 42.5 |
| surface resistance | | $9.6 \cdot 10^{10}$ Ohm |
| volume resistance | | $1 \cdot 10^{11}$ Ohm |
| corrosion | | AN 1.6 – 1.8 |
| dielectric constant $\epsilon$ | 1000 Hz | 4.2 – 4.3 |
| | 50 Hz | 4.55 – 4.6 |
| tan $\delta$ | 1000 Hz | 0.035 – 0.039 |
| | 50 Hz | 0.056 – 0.061 |

EXAMPLE 12

The instructions of Example 10 are followed, but instead of 4 mols of monohydroxybenzene compound 556 g of bisphenol A (2 mols) are employed; and instead of 320 g of 44% strength by weight aqueous formaldehyde solution only 220 g of this solution are employed.

This dispersion is white and can be diluted indefinitely and has a much higher curing speed and sterilisation strength of coatings made therewith.

Production of a mixture of α- and β-phenylethylphenol as solution in the required amount of phenol (raw product for Examples 1, 4, 7, 9, 10 and 11).

376 g phenol (4 mols), 208 g styrene (2 mols) and 15 g of crystalline oxalic acid are mixed and heated to 150° – 160°C, while stirred, and kept at this temperature for 2 hours. Thereafter the contents of free sytrene has dropped to below 5 percent by weight, and a light-colored oily reaction product is obtained having followed data:

| | | |
|---|---|---|
| index of refraction $n_{D20}$ | : | 1.5750 |
| color number (iodine) | : | 2.5 |

Production of a mixture of α- and β-phenylethylphenol as solution in the required amount of phenol (raw product for Example 2).

376 g phenol (4 mols), 104 g styrene (1 mol) and 20 g of crystalline oxalic acid are mixed and heated to 150° to 160°C, while stirred, and kept at this temperature for 4 hours. Thereafter the contents of free styrene has dropped to below 1 percent by weight, and a light-colored oily reaction product is obtained.

Production of a mixture of β- and α-phenylethylphenol as solution in the required amount of phenol (raw product for Example 8).

376 g phenol (4 mols), 236 g technical vinyltoluene (commercial mixture of isomers) (2 mols) and 19 g of crystalline oxalic acid are mixed and heated to 150° – 160°C, while stirred, and kept at this temperature for 2 hours. Thereafter the contents of free vinyltoluene has dropped to below 5 percent by weight, and a light-colored oily reaction product is obtained.

In a special embodiment of the present invention, for which arylsubstituted phenols having an aromatic ring in the substituent are employed, such components are preferred which are, dissolved in phenol or substituted phenol, produced in a novel production step. The arylsubstituted phenol is made in a dissolved state by reacting 1 mol of phenol or substituted phenol respectively, individually or in mixture, and 1 mol of styrene or styrene-derivative in excess phenol or substituted phenol respectively, individually or in mixture, as the solvent, by heating in the presence of an acid as catalyzer, whereby this working method is characterized in that about 2 – 5% by weight of oxalic acid, preferably 2.5 – 3.5% by weight oxalic acid, relative to the total weight of phenol or substituted phenol respectively, and styrene or styrene derivative respectively, are employed and the mixture is heated to 150° – 160°C for so long until at least 95% by weight of the employed styrene or styrenederivative is present in reacted form.

The solution such obtained has the great advantage of being rather light-colored, nearly free of byproducts and is suitable for the manufacture of dispersions of the present invention directly without any washing and distilling procedures.

The manufacture of alkylaryl phenol solution, such as explained above, has been disclosed by the same applicant in Swiss Pat. application 9197/72 of June 19, 1972 and application of an addition thereto of No. 6796/73 of May 14, 1973.

In a preferred embodiment of the invention 4 mols of the raw product employed in Examples 1, 2, 4, 7, 8, 9, 10 and 11 and which is produced according to instructions given behind Example 12, are mixed whilst stirring with 200 g of deionized water, 10 g of hydroxyethylcellulose, 5 g of a 88 mol percent saponified polyvinyl alcohol and 20 g of a 98 mol percent saponified polyvinyl alcohol at 20° – 50°C for 10 – 30 minutes. 300 – 380 g 44% strength by weight aqueous formaldehyde solution, 50 – 80 g of 88% strength by weight aqueous solution of a polyethylene glycol ether of nonylphenol containing 25 – 30 mols ethyleneoxide per mol nonylphenol, are added thereto at 20° – 50°C whilst stirring and then 20 – 35 g of 25% strength by weight aqueous ammonia are added and the mix is heated to 100° – 105°C and kept refluxing for 4 – 7 hours. Thereafter at the boil further 300 g of deionized water are added; 100 ml are distilled off at normal pressure and the obtained dispersion is cooled to below 40°C whilst stirring.

Dispersions obtained according to this preferred embodiment have very little free phenol and show excellent storage stability. Using these dispersions hard (impregnated) papers are made which have a very low absorption of water.

In a further preferred embodiment of the invention 4 mols of the raw product employed in Examples 1, 2, 4, 7, 8, 9, 10 and 11 are mixed whilst stirring with 350 g of deionized water, 10 g of hydroxyethylcellulose, 5 g of a 88 mol percent saponified polyvinyl alcohol and 20 g of a 98 mol percent saponified polyvinyl alcohol at 20° – 50°C for 10 – 30 minutes. 300 – 380 g of 44% strength by weight aqueous formaldehyde, 50 g of isobutanol, 150 g of wood oil and 50 – 80 g of 80% strength by weight aqueous solution of a polyethylene glycol ether of nonylphenol containing 20 – 30 mols ethyleneoxide per mol nonylphenol, are added thereto at 20°– 50°C whilst stirring, and then 20 – 35 g of 25% strength by weight aqueous ammonia are added and the mix is heated to 100° – 105°C and kept refluxing for 4 – 7 hours. Thereafter further 300 g of deionized water are added at the boil; 150 ml are distilled off at normal pressure and the obtained dispersion is cooled to below 40°C whilst stirring.

Dispersions obtained according to this preferred embodiment have very little free phenol, therefore reducing pollution of environment, and show excellent storage stability. Using these dispersions hard (impregnated) papers are made having very good punching index and low water absorption.

The instructions given in Example 6 present a further preferred embodiment of the invention. Dispersions made according to this embodiment show a high curing speed.

The instructions given in Example 12 presents a further preferred embodiment of the invention; from these dispersions coatings are made having a special resistance against chemicals.

What is claimed is:

1. Process for the manufacture of a water-dilutable, aqueous dispersion of a thermosetting reaction product containing an emulsifier and a protective colloid which comprises
   a. warming an aqueous mixture of
      1. a substituted phenol selected from the group consisting of
         A. a substituted phenol having one phenolic hydroxyl group and from 1 to 4 substituents on the phenol nucleus and having at least one ring carbon atom of the phenol available for reaction with formaldehyde, and which substituted phenol has a speed of reaction which is 40 to 150% of the speed of reaction of the unsubstituted phenol, and
         B. a dihydroxyphenylalkane of the general formula

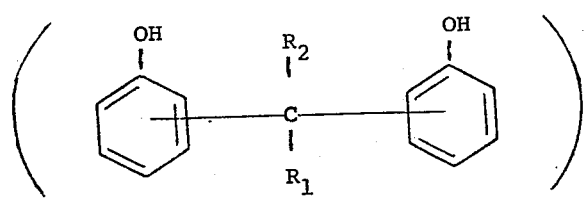

wherein $R_1$ and $R_2$ are identical or different, and each of $R_1$ and $R_2$ denote hydrogen or aliphatic group of the formula $C_nH_{2n+1}$ wherein $n$ is 1 to 5, with the limitation that the substituent

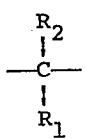

has to be on an ortho or para position relative to the phenolic hydroxyl groups and
         C. mixtures of (A) and (B),
      2. phenol,
      3. formaldehyde or a formaldehyde donor,
      4. a basic nitrogen compound selected from the group consisting of ammonia, primary amines and secondary amines,
      5. a non-ionic emulsifier which is compatible with phenolic resin,
      6. polyvinyl alcohol, and
      7. hydroxyethylcellulose, until a sample of the reaction mixture has a B-time of 30 seconds to 10 minutes at 160°C, and
   b. while stirring, cooling the mixture from step (a), said process being further characterized in that the mixture contains the substituted phenol (1) and the phenol (2) in a ratio such that the average functionality of the sum of these phenolic compounds (1) and (2) relative to formaldehyde is between 2.1 and 2.8, and the amount of formaldehyde (3) in the mixture is so chosen that the molar ratio of the total sum of formaldehyde (3) to the sum of the phenolic components (1) and (2) ranges from about 1.0 and 1.4 to 1,
   the content of the basic nitrogen component (4) in the mixture ranges from about 5 to 50 mol percent relative to the total weight of the phenolic components (1) and (2),
   the content of the non-ionic emulsifier (5) in the mixture ranging from 5 to 25% by weight relative to the total weight of the phenols (1) and (2),
   the weight ratio of polyvinyl alcohol (6) relative to the hydroxyethyl cellulose (7) ranging from about 2 to 1 to 4 to 1, and
   the sum of the weights of the polyvinyl alcohol (6) and hydroxyethyl cellulose (7) in the mixture ranging from about 5 to about 25% by weight relative to the total weight of the phenol components,
   the amount of water in the mixture, including added water and water of reaction, ranging from 30 to 60% by weight, relative to the weight of the total mixture.

2. Process of claim 1 wherein the substituted phenol (1) (A) is used, and such substituted phenol is made by heating to about 150° to 160°C a mixture of phenol and a styrene compound in excess phenol as the solvent in the presence of about 2 to about 5% by weight of oxalic acid, relative to the total amount of phenol and styrene compound, until the reaction mixture contains at least 95% by weight of an equimolar phenol-styrene reaction product.

3. Process of claim 1 wherein the substituted phenol component (1) is of the (A) type and is selected from the group consisting of
   m-cresol,
   3,4-dimethylphenol,
   3,5-dimethylphenol,
   2,5-dimethylphenol,
   m-ethylphenol,
   m-propylphenol,
   m-butylphenol,
   n-butylphenol,
   p-tert-butylphenol,
   o-n-propenylphenol,
   o-isopropenylphenol,
   p-n-propenylphenol
   p-isopropenylphenol,
   o-allylphenol,
   p-allylphenol,
   o-phenylphenol,
   p-phenylphenol,
   o-α-phenylethylphenol,
   p-α-phenylethylphenol,
   o-β-phenylethylphenol,
   p-β-phenylethylphenol,
   o-α-phenylisopropylphenol,
   p-α-phenylisopropylphenol, o-β-phenylisopropylphenol,
P-β-phenylisopropylphenol,
and ethylene/phenol substituted phenol reaction products which boil at from 230° to 260°C and of which substituted phenol reaction product 60 to 70% of which dissolves in an alkaline solution, and mixtures thereof.

4. Process of claim 1 wherein the substituted phenol (1) is a dihydroxyphenylalkane of formula (1) (B).

5. Process of claim 1 wherein water is added to the mixture during the stirring and cooling step.

6. Product produced by the process of claim 1.

7. Product produced by the process of claim 2.

* * * * *

UNITED STATES PATENT OFFICE
CERTIFICATE OF CORRECTION

Patent No. 3,875,089            Dated      April 1, 1975

Inventor(s) Heinz-Bernhard Hofel; Hans-Joachim Kiessling, and Fred Lampert

It is certified that error appears in the above-identified patent and that said Letters Patent are hereby corrected as shown below:

Col. 10, line 43: In Table, "34.4" should read -- 37.4 --.

Signed and Sealed this twenty-sixth Day of August 1975

[SEAL]

Attest:

RUTH C. MASON
Attesting Officer

C. MARSHALL DANN
Commissioner of Patents and Trademarks